(No Model.)
W. H. LAFAELLE.
CLUTCH.
No. 591,080. Patented Oct. 5, 1897.
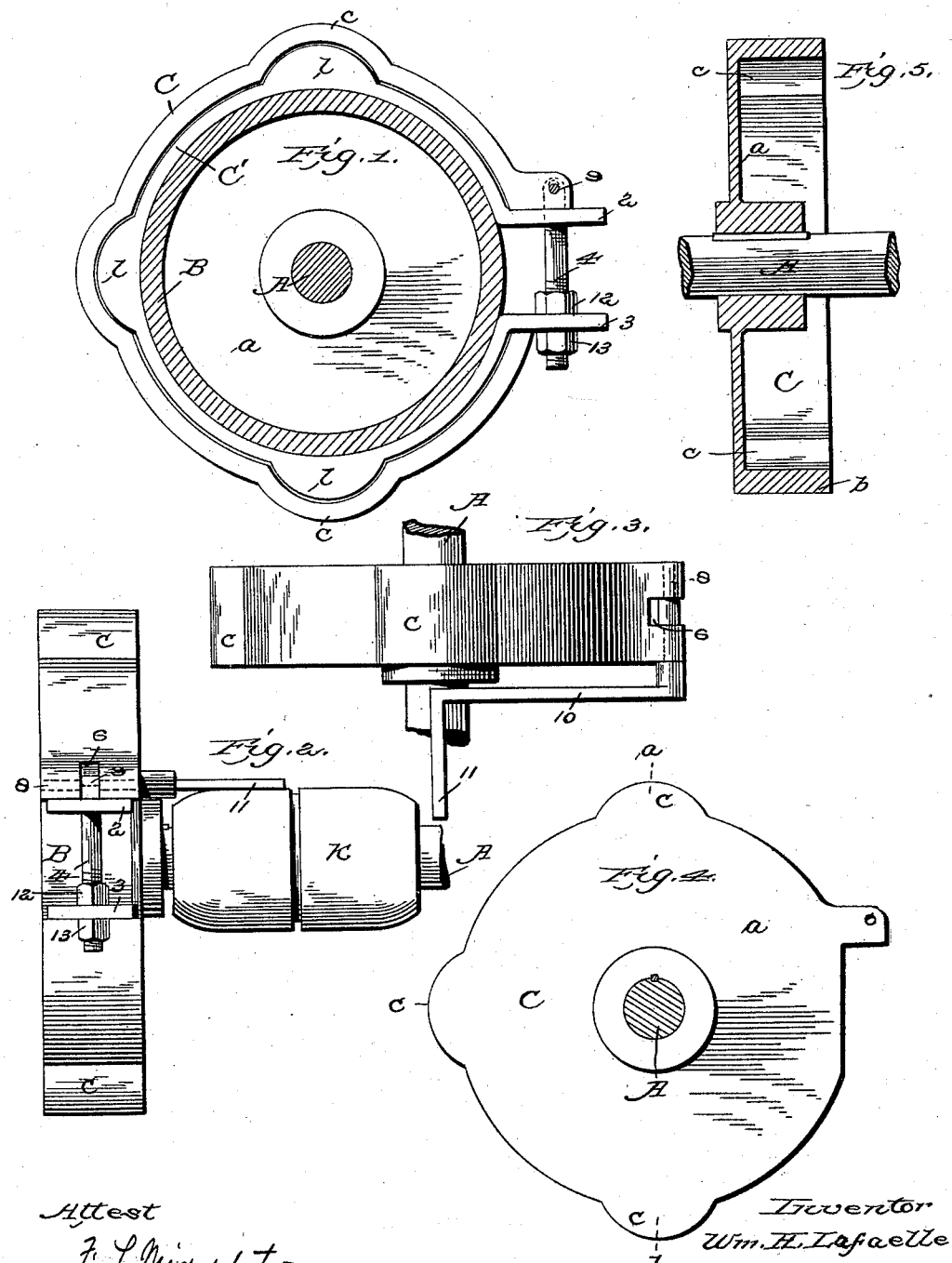
Attest
F. L. Middleton
C. S. Middleton
Inventor
Wm. H. Lafaelle
by Ellis Spear
Atty.

UNITED STATES PATENT OFFICE.

WILLIAM H. LAFAELLE, OF BOSTON, MASSACHUSETTS, ASSIGNOR OF TWO-THIRDS TO HENRY F. NAPHEN AND HUBERT H. WALDRON, OF SAME PLACE.

CLUTCH.

SPECIFICATION forming part of Letters Patent No. 591,080, dated October 5, 1897.

Application filed May 6, 1897. Serial No. 635,407. (No model.)

*To all whom it may concern:*

Be it known that I, WILLIAM H. LAFAELLE, a citizen of the United States, residing at Boston, in the county of Suffolk and State of Massachusetts, have invented certain new and useful Improvements in Clutches, of which the following is a specification, reference being had therein to the accompanying drawings.

My invention is a clutch adapted to be used in connection with a hoisting-machine such as that shown in an application filed by me in the United States Patent Office of even date herewith, Serial No. 635,406, but applicable in any other situation and with any other form of mechanism where a clutch is used, and I do not limit myself in this particular.

In the accompanying drawings I have illustrated the invention, Figure 1 being a section through the shaft and friction-ring with the clutch device shown in elevation. Fig. 2 is a side elevation of the clutch and the means for throwing it into engagement. Fig. 3 is a plan view. Fig. 4 is a rear view of the frame or bonnet, and Fig. 5 is a sectional view on the line $a\,b$ of Fig. 4.

In the drawings the shaft represented at A may be that of a hoisting-machine or any other machine to which the clutch is to be applied. As is usual with such machines, a friction-drum B is loosely mounted upon the shaft, and it is the purpose of the clutch to engage this drum so as to cause it to rotate with the shaft or to free it from engagement and allow it to remain inactive. To this end I utilize a frame which I term a "bonnet" C. This is secured rigidly to the shaft, as shown in Fig. 5, and is provided with a back wall $a$ and a forwardly-projecting flange $b$. This flange, as shown in Fig. 1, is provided with swells or projecting portions $c$, and the flange overhangs the end of the drum B.

Located within the flange $b$ of the bonnet C is a friction-band C', having a smooth interior fitted to the friction-surface of the drum B, but on its exterior provided with convex portions 1, fitting the corresponding portions $c$ of the bonnet, and these parts engaging each other cause the friction-band to rotate. As the bonnet rotates with the shaft it will be observed, therefore, that in order to cause the drum to rotate with the shaft it is only necessary to bring the friction-band into close contact with the drum. This action is secured by extending the ends of the friction-band, as shown at 2 3, Fig. 1. A bolt 4 passes through these ends, and the bolt has a lower threaded end adapted to receive nuts 12 13, one of these nuts being located upon either side of the projecting tongue 3 of the friction-band.

The upper end of the bolt is eccentrically supported in the end of the bonnet, as shown in Figs. 1 and 2. The bonnet end has a slot 6, adapted to receive the head of the bolt, and laterally-extending passages registering with the slot 6 through the end of the bonnet, and these passages receive and form a bearing for the end of a rod 8, having an eccentric center 9 registering with the slot 6 and supporting the end of the rod 4 by its eccentric portion. The rod 8 has an arm 10, extending at right angles thereto inwardly toward the shaft, and a second extension 11, paralleling the shaft a slight distance above the same.

The shifting or sliding part K, which may be operated in any convenient manner, is adapted to engage the extension 11 to lift the same, and the effect is to turn the rod 8 and its eccentric portion 9 and thus lift the bolt 4 and draw together the parts 2 3 of the friction-band, which applies the band to the drum, and in this position of the parts the clutch is applied and the drum will rotate with the clutch. The nuts 12 13 are to give the necessary adjustment, so that the eccentric action will be entirely sufficient to apply the frictional contact.

What I claim is—

In combination, a drum having a friction-surface, a clutch comprising a friction-band having projecting ends, a bonnet or frame secured to the shaft and in connection with the friction-band, a bolt eccentrically pivoted in the bonnet and adjustably secured to the friction-band and an extension from the eccentric support of the bolt with means for operating said extension to apply or throw off the friction, substantially as described.

In testimony whereof I affix my signature in presence of two witnesses.

WILLIAM H. LAFAELLE.

Witnesses:
C. H. WELCH,
G. E. W. ARMSTRONG.